UNITED STATES PATENT OFFICE.

JOHN M. WHITE, OF MERIDIAN, MISSISSIPPI.

ANTISYPHILITIC ARSENICAL PREPARATION AND PROCESS OF MAKING THE SAME.

1,313,657. Specification of Letters Patent. Patented Aug. 19, 1919.

No Drawing. Application filed December 12, 1918. Serial No. 266,465.

*To all whom it may concern:*

Be it known that I, JOHN M. WHITE, a citizen of the United States, residing at Meridian, in the county of Lauderdale and State of Mississippi, have invented certain new and useful Improved Antisyphilitic Arsenical Preparations and Processes of Making the Same, of which the following is a specification.

The present invention relates to the production of an arsenical organic body, which is highly suitable for the treatment of syphilis, and embraces both the product itself and the process of its preparation. Prior to my invention, substances containing arsenic and organic radicals have been employed for the treatment of syphilis, the substances previously used which gave the best results were, however, open to the objection of being insoluble in water, and hence it has been the usual practice to employ such substances dissolved in an oily material. The use of oily vehicles to be administered by injection into the human organism is open to objection, in that the medicines so administered lose a considerable portion of their effectiveness, due to the non-miscibility of the vehicle and those fluids of the human body with which they come into contact, and also they are open to the objection that they produce severe pain and numbness of the portions of the body at which the injection is made.

My invention relates to materials which are readily soluble in water and in other liquids, such as alcohol, which are readily miscible with the fluids of the human body, and furthermore, the aqueous or alcoholic solutions, when so injected, cause very little pain or numbness of the tissues at the point of injection.

The substances which are produced in the present invention may be formed most conveniently by reacting with benzyl alcohol on sodium methyl arsenid, or sodium dimethyl arsenid (sodium cacodylate). The reaction is preferably produced by mixing the two substances in aqueous solutions, the reaction taking place efficiently at 70°.

The reactions taking place are believed to be as follows:

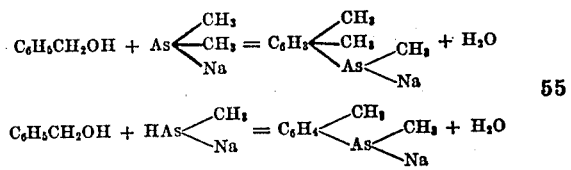

In the above examples sodium compounds are referred to, but it is also possible to employ the corresponding compounds of other alkali metals, particularly those of lithium or potassium.

The compound produced, when employing sodium cacodylate and benzyl alcohol is a colorless liquid apparently having the formula above indicated, having a faint aromatic odor, having a specific gravity of 1.08, at 18° C., having a boiling point of about 210° C., being very soluble in water and in alcohol. It dissolves in water and alcohol without decomposition, it is not altered on exposure to air, the alkaline and neutral solutions in water and alcohol are both stable in the air.

For use in syphilis the most convenient mode known to me is to inject into the subcutaneous tissue, or into the venous circulation about .56 gram dissolved in about 4 to 15 cc. of distilled water.

Sodium bicarbonate or other mild alkali may be added to the solution, if desired.

The product has the further advantage of being non-toxic and of being a local anesthetic, and being almost painless when injected into the tissue.

The dimethyl compound, sodium cacodylate, as above referred to, may be employed, but the mono-methyl compound has some advantages, as it is less expensive, and seems to produce all of the desired valuable properties.

For directly preparing and using the product of the present invention, when using sodium cacodylate, I preferably mix together:—

| | |
|---|---|
| Sodium cacodylate | 3 grains. |
| Benzyl alcohol | 6 grains. |
| Distilled water | 40 minims. |

I then shake this up at ordinary room temperature, 70° F., and inject the same into the patient, preferably after sterilizing in the ordinary well known way.

The compound produced when employing sodium methyl arsenid and benzyl alcohol is a colorless liquid apparently having the formula above indicated having a faint aromatic odor, having a specific gravity of 1.1 at 18° C., having a boiling point of about 212° C., and being very soluble in water and in alcohol. It dissolves in water and alcohol without decomposition, is not altered on exposure to air, the alkaline and neutral solutions in water or in alcohol both being stable in the air. For directly preparing and using this product, I preferably mix together:

| | |
|---|---|
| Sodium methyl arsenid | 2 grains. |
| Benzyl alcohol | 6 grains. |
| Distilled water | 40 minims. |

I then shake this mixture at ordinary room temperature, and apply as in the previous example.

I claim:

1. An antisyphilitic medicine containing as its essential constituent, a compound produced by the interaction of an alkali metal dimethyl arsenid and benzyl alcohol, said compound being a colorless liquid having a specific gravity of about 1.08 at 18° C., having a boiling point of about 210° C., and being soluble in water and in alcohol, and stable on exposure to air, both in its pure state and in its aqueous neutral and alkaline solutions.

2. The herein described product consisting of the reaction product of benzyl alcohol and an alkali metal methyl arsenid, said product being a colorless liquid, with a faint aromatic odor, soluble in water and in alcohol, stable on exposure to air, both in its pure state and in its neutral and alkaline aqueous solutions, such compound containing arsenic, and possessing powerful antisyphilitic properties, and producing no substantial amount of pain when injected, in aqueous solution, with or without alkali bicarbonate, into the tissues of the living body.

3. A process of making an antisyphilitic medicine which comprises reacting with benzyl alcohol on an alkali metal dimethyl arsenid in aqueous solution.

4. A process of making an antisyphilitic medicine which comprises reacting with benzyl alcohol on an alkali metal methyl arsenid.

In testimony whereof I have signed my name to this specification.

JOHN M. WHITE.